Sept. 8, 1953          W. V. CORNETT          2,651,292

PNEUMATIC CYLINDER HAMMER AND CONTROL THEREFOR

Filed Jan. 25, 1952          5 Sheets-Sheet 1

*INVENTOR.*
WALTER V. CORNETT

BY

*Van Deventer & Shively*

ATTORNEYS

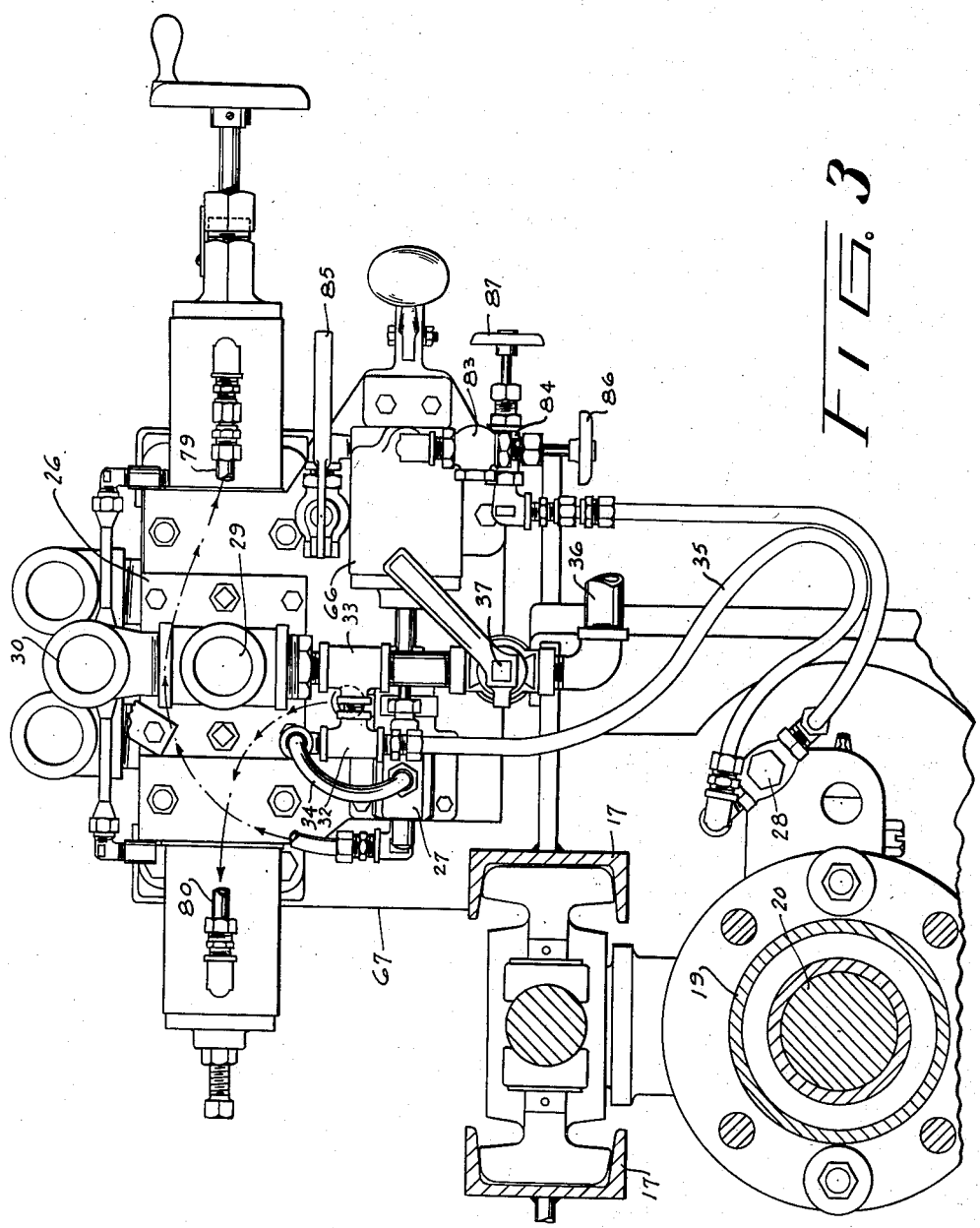

Sept. 8, 1953  W. V. CORNETT  2,651,292
PNEUMATIC CYLINDER HAMMER AND CONTROL THEREFOR
Filed Jan. 25, 1952  5 Sheets-Sheet 3

INVENTOR.
WALTER V. CORNETT
BY
ATTORNEYS

INVENTOR.
WALTER V. CORNETT

ATTORNEYS

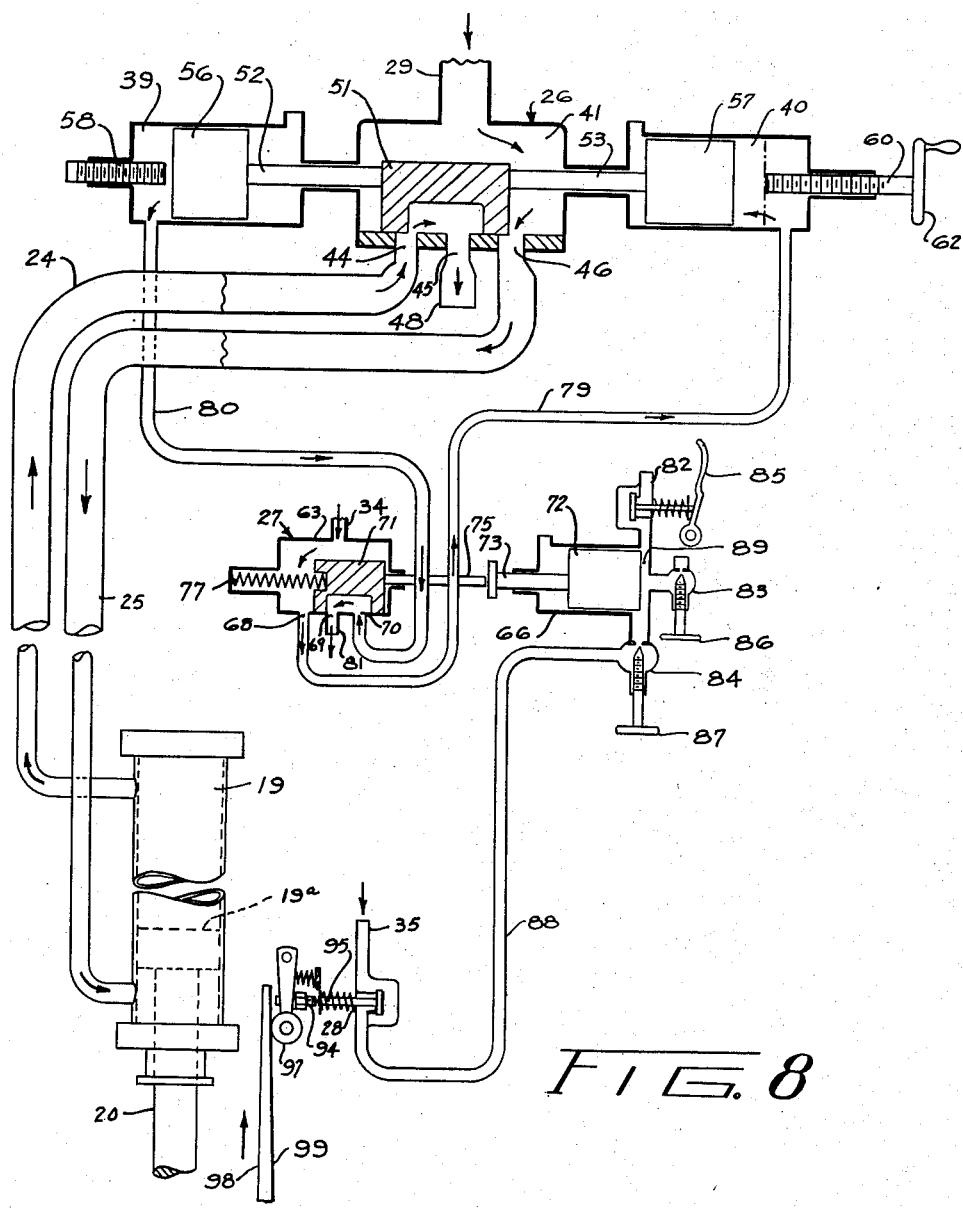

Patented Sept. 8, 1953

2,651,292

UNITED STATES PATENT OFFICE 2,651,292

PNEUMATIC CYLINDER HAMMER AND CONTROL THEREFOR

Walter V. Cornett, Los Angeles, Calif.

Application January 25, 1952, Serial No. 268,318

16 Claims. (Cl. 121—23)

1

The present invention pertains to improvements in pneumatic cylinder hammers and controls therefor, particularly adapted for use on pavement breakers, fill tampers and the like, such as that disclosed in my co-pending application Serial Number 104,569, filed July 13, 1949.

An object of the invention is to provide a control valve combination adapted to effect automatically repetitive strokes by the pneumatic cylinder.

A further object is to provide a device of the above type adapted to provide positive operation with extremely fine adjustment of the force of the hammer or tamper blow, in a range extending from a few pounds' force to the maximum capacity of the pneumatic cylinder.

A further object is to provide a control device of the above type in which the force of the blow may be increased or decreased to any desired extent while the machine is in continuous operation.

Another object is to provide a device of the above nature including means to control and adjust the speed of repetitive operation.

Another object is to provide a device of the nature set forth by which the length of hammer stroke may be automatically self-adjusting in working of a surface of varying level.

Another object is to provide a device of the above type including optional means for manual control of single or repetitive blows.

Other objects and advantages will become evident to those skilled in the art during the course of the following description in connection with the accompanying drawings, in which:

Figure 3 is a plan view of the control assembly;

Figure 8 is an operational diagrammatic illustration of the system.

Figure 1:
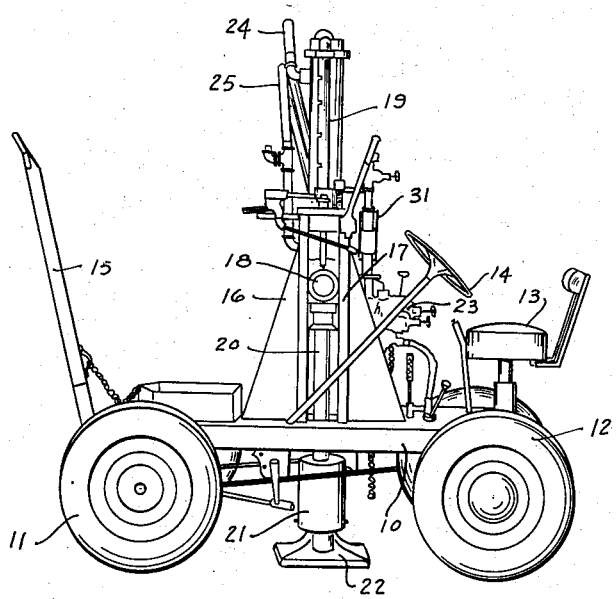
Figure 1 illustrates a breaking and tamping machine equipped with the improved control apparatus.

Referring to Figure 1, the numeral 10 designates a chassis frame under which are mounted rubber-tired front and rear wheels 11 and 12. A

2 driver's seat 13 is located on the rear of the frame 10, behind a steering wheel 14 for use when the device is self-propelled. For towing to a project, a draw-bar or tongue 15 is provided on the front of the machine.

An upright frame 16, secured on the top of the chassis frame 10, includes vertical rails or ways 17 in which is mounted a cross-head 18 carrying a double-acting air cylinder 19. The piston-rod 20 of the cylinder protrudes from the bottom thereof, and has secured to its lower end a head 21 adapted to hold various types of impact tools, herein illustrated by a tamper 22. The cross-head 18 and attached cylinder 19, illustrated in upper position, are adjustable also to various lower positions in the ways 17 in order to accommodate the device to working in trenches or holes of various depths, by means such as those set forth in the above-mentioned application Serial No. 104,569.

The numeral 23 generally designates the control mechanism forming a principal subject of the present invention and shown in detail in the subsequent drawings, this combination being secured to the left side of the upright frame 16 in convenient reach of the operator occupying the seat 13. Flexible air hoses 24 and 25 connect the control unit 23 with the upper and lower ends of the cylinder 19, also as hereinafter more fully set forth.

The principal sub-assemblies of the control unit 23, shown in plan view in Figure 3, comprise a main air supply control valve sub-assembly 26, hereinafter referred to as the main valve sub-assembly, a pilot valve sub-assembly 27, and a trip valve 28. Mounted on top of the main valve 26 is a fitting 29 adapted to be connected to a source of compressed air. A street elbow 30 provides a connection into the fitting 29 from an air-line lubricator 31, Fig. 1. Branch T's 32 and 33, Fig. 3, provide a high pressure air connection via a tube 34 to the pilot valve 27, and a similar connection via a flexible tube 35 to the trip valve 28. A pipe 36, provided with a manually operable stop-cock 37, comprises an air supply connection to a pneumatic propulsion motor, the latter not shown as it is not per se a part of the present invention.

Figure 5:
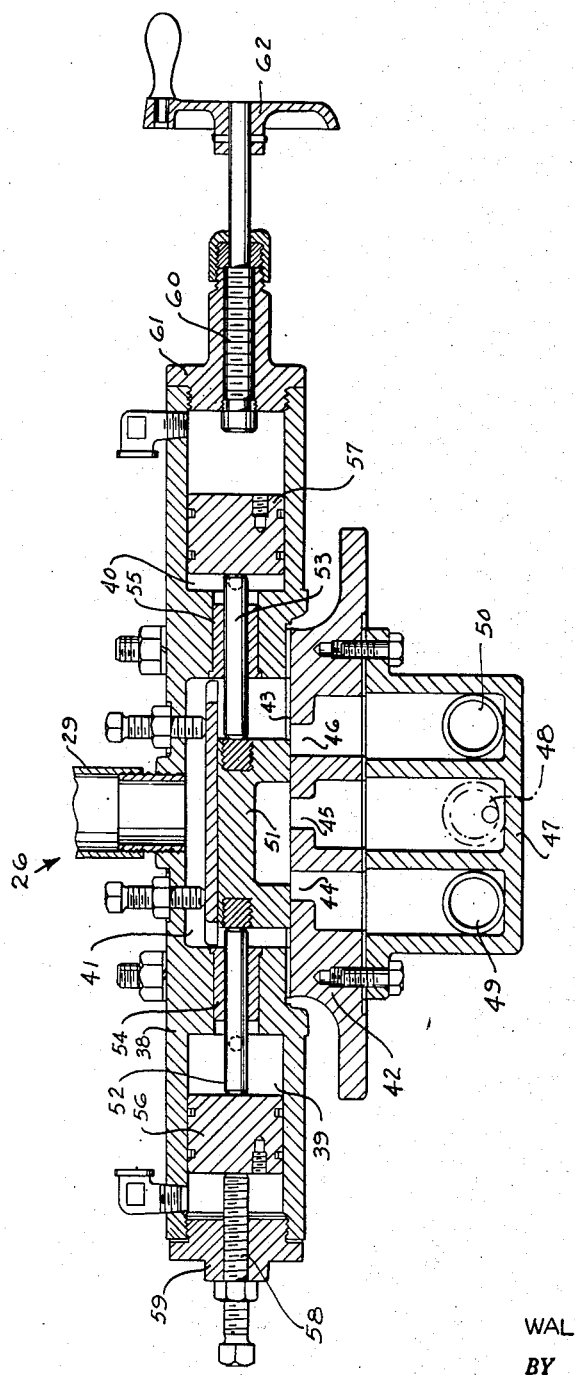
Figure 5 is a longitudinal sectional view of the main air supply control valve.
Figure 6:
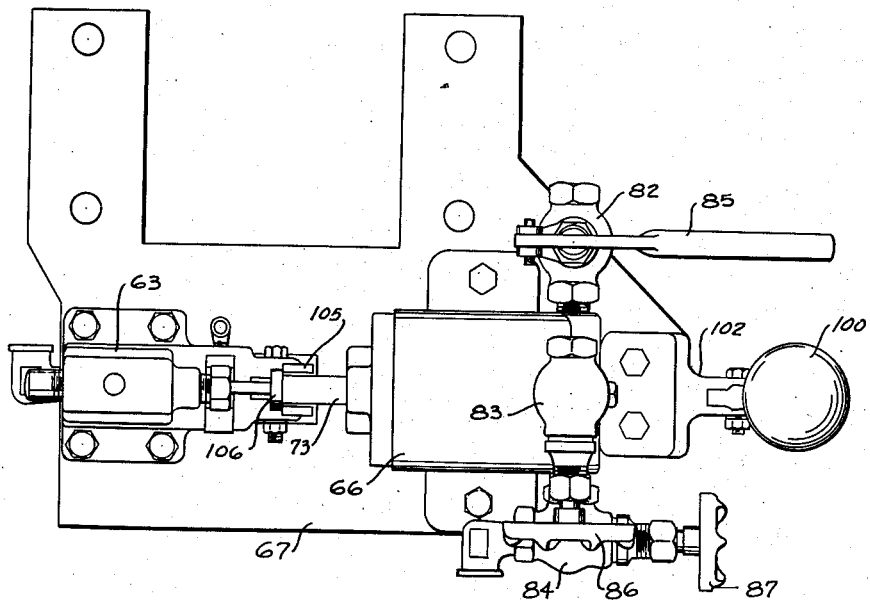
Figure 6 is a detail plan view of the pilot-valve sub-assembly.

Referring to Figure 5, the main valve 26 includes a body 38 comprising opposed left and right hand cylinders 39 and 40 and a central chamber 41. The bottom of the chamber 41 is formed by a plate 42 having an upper valve surface 43 pierced by three ports 44, 45 and 46. A lower casing member 47 provides means to connect the middle port 45 to an exhaust line 48, while the left and right-hand ports 44 and 46 are similarly connected via fittings 49 and 50 and the flexible hoses 24 and 25 respectively with the upper and lower ends of the air cylinder 19, as shown diagrammatically in Figure 8.

An inverted U-valve member 51, backed by an adjustable upper bearing plate 52, is slidably mounted on the valve surface 43. The member 51 is so proportioned as to connect the port 44 to the exhaust port 45 and the port 46 to the air chamber 41 when in left-hand position as shown, and similarly to connect the port 46 to the exhaust port 45 and the port 44 to the chamber 41 when in right-hand position.

A pair of oppositely directed rods 52 and 53, attached to the U-valve member 51 and slidable in sealing sleeves 54 and 55, abut pistons 56 and 57 in the left and right cylinders 39 and 40 respectively. An adjustable stop screw 58 in the head 59 of the left cylinder 39 is adapted to engage the piston 56 to limit the leftward travel of the pistons and the valve 51. A second stop screw 60, threaded in the head 61 of the right cylinder 40 and adapted to be engaged by the piston 57, is provided with an exterior hand-wheel 62 by means of which the right-ward travel of the piston and valve combination may be adjusted while the device is in operation.

Figure 7:
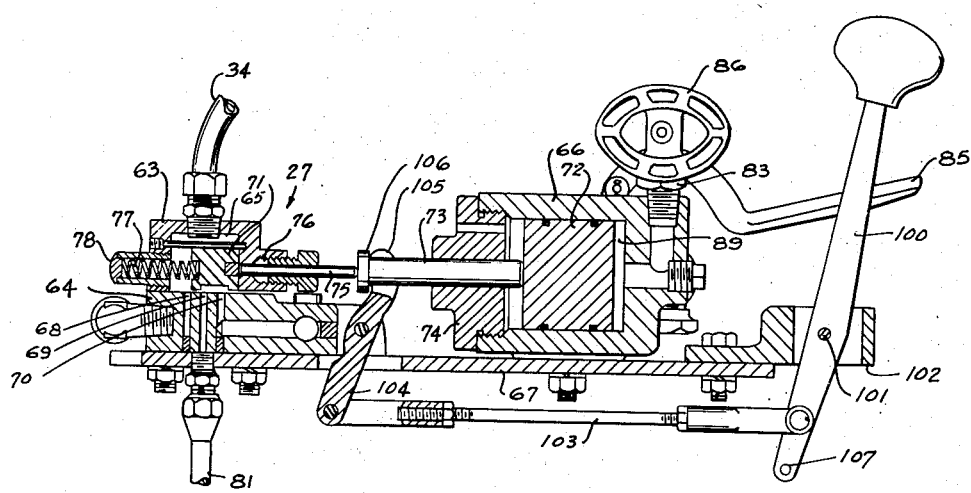
Figure 7 is a longitudinal section of the pilot valve sub-assembly.

Referring to Figure 7, it will be seen that the pilot valve sub-assembly 27 includes a casing 63 surmounting a port-plate 64 so as to enclose a chamber 65 connected to the high-pressure air tube 34, and a cylinder 66, all mounted on a common supporting plate 67. The port-plate 64 contains three ports 68, 69 and 70 controllable by the travel of a small sliding inverted U-valve member 71 in substantially the same manner as described above for the main valve, Figure 5.

A piston 72 in the cylinder 66 bears against a plunger 73 slidably mounted in the inner head 74 of the cylinder. The plunger 73 in turn bears against a sliding rod or stem 75 attached to the U-valve member 71 and provided with a seal 76 in the casing 63. A compression spring 77, retained in a cap 78, urges the valve member 71, the rod 75, the plunger 73 and piston 72 to the right, as shown in Figures 7 and 8.

The port 68 is connected through a tube 79 with the outer end of the main valve cylinder 40, Figure 8. Similarly, a tube 80 connects the port 70 to the outer end of the cylinder 39, while the middle port 69 is connected to an exhaust tube 81.

Three valves 82, 83 and 84, Figures 3, 6, 7 and 8, are connected into the upper end chamber 89 of the pilot cylinder 66. The valve 82 is a normally closed release valve, preferably of the type used on air whistles, and is manually operable by a lever 85. The valve 83, hereinafter referred to as the bleeder valve, is of the needle type manually adjustable by means of a handle 86 to open to the outer atmosphere.

The valve 84, hereinafter termed the inlet valve, is also of the needle type manually adjustable by means of a handle 87, and is connected through a flexible tube 88 with the trip valve 28. In the actual structure the valves 82, 83 and 84 are disposed as shown in Figure 3, but for clarity in operational explanation are shown diagrammatically in the same plane in Figure 8.

Figures 2, 4:
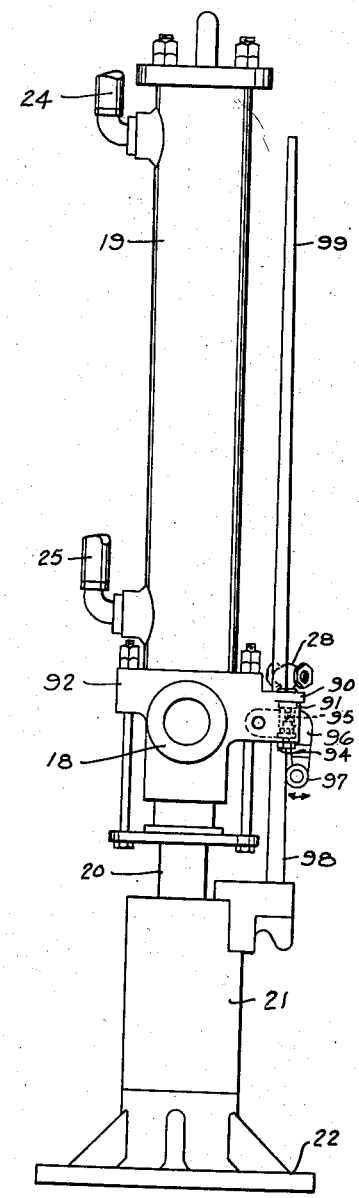
Figure 2 is a detail side view of the pneumatic cylinder illustrating the main air supply connections and trip valve mechanism applied thereto.
Figure 4 is a detail rear view of the trip valve sub-assembly.

The trip valve 28, Figures 2 and 4, is secured to a small bracket 90 on a guide lug 91 forming part of the lower head and cross-head body 92 of the air cylinder 19. A spring-pressed tappet lever 93, pivoted to the lug 91, has threaded therein an adjusting screw 94 adapted to engage the actuating plunger 95 of the valve 28, the latter being of the normally closed spring-pressed type. A downward extension 96 of the lever 93 carries a roller 97.

Referring to Figure 2, the numeral 98 designates a vertical guide rod secured to the hammer head 21 and slidable through the lug 91, thus serving to prevent the hammer, rod and piston assembly from turning during operation. The outer side of the rod 98 is cut away to form a tapering flat surface 99 adapted to engage the roller 97. When the hammer 21 is in lower position, the upper end of the rod 98 occupies the position shown in Figure 8, in which position the taper surface 99 and the roller 97 are sufficiently retracted to allow the trip valve 28 to close. As the hammer and rod 98 move upward the taper surface 99 acts as a cam to force the roller 98 outward and thereby open the valve 28. The threaded pusher screw 94 allows adjustment of the exact relationship between hammer travel and valve operation.

The general operation of the device is as follows, referring to diagrammatic Figure 8. As previously noted the main or striker valve chamber 41, the pilot valve casing 63, and the inlet tube 35 of the trip valve 28 are all connected to the source of high pressure compressed air. The parts in Figure 8 are shown in the relationship existing as the hammer piston rod 20 and its attached parts including the hammer, tool and the guide rod 98, have reached the bottom of their working stroke. The retraction of taper surface 99 has allowed the trip valve 28 to close as shown, shutting off any flow of compressed air therethrough to the tube 88, valve 84 and the pilot piston chamber 89. Since the chamber 89 is open to the atmosphere through the bleeder valve 83, the spring 77 has been enabled to move the pilot valve member 71 and piston 72 to the right by forcing the air out through the bleeder.

The movement of the valve member 71 into right-hand position admits high pressure air through the port 68 and tube 79 to the right-hand striking valve cylinder 40, at the same time opening the left-hand cylinder 39 to exhaust via the ports 69 and 70 and the tube 80. The main or striking valve working parts are thereby forced to the left as shown. By this movement the main valve member 51 opens the upper end of the cylinder 19 to exhaust via the hose 24 and ports 44 and 45, at the same time opening the port 46 to the chamber 41 to admit high pressure air through the hose 25 to the lower end of the cylinder 19. The striker assembly including the guide rod 98 is thereby thrust upward, raising the tool such as the tamper 22 (Fig. 2) from the working surface.

As the guide rod 98 rises toward the top of its stroke the taper surface 99, opens the pilot valve 28, admitting high pressure air through the tube 88 and inlet valve 84 to the pilot cylinder chamber 89. The inrush of air is greater than the set escape capacity of the bleeder valve 83, so that pressure in the chamber 89 rises. As soon as this pressure on the piston 72 becomes sufficient to overcome the spring 77 the valve member 71 is moved to the left, reversing the previously described exhaust and high pressure air connections to the main valve cylinders 39 and 40. The main valve member 51 is thereby forced to the right, opening the lower end of the striker cylinder 19 to exhaust and admitting high pressure air to the upper end of the cylinder. The power piston 19a, Fig. 8, acted upon by the high pressure on its upper surface, drives the hammer assembly downward to perform the working or impact stroke.

The downward motion of the rod 98 allows the roller 97 to move inward and the trip valve 28 to close, cutting off the compressed air supply to the pilot valve cylinder 66. Thereupon the escape of air through the bleeder valve 83 causes the pressure in the chamber 89 to fall, allowing the spring 77 to throw the valve member 71 to the right as shown in Fig. 8, thus initiating the next upward stroke of the hammer mechanism in the manner previously described.

It will be evident from the above description that once the inlet valve 84 has been opened the device automatically controls the power cylinder to provide continuously repetitive working strokes. The inlet valve 84 may also properly be termed the automatic starting valve, since it is opened to initiate the continuous operation described. Similarly, to stop the automatic action the valve 84 is closed, this being the normal procedure when the working operation is completed or is to be discontinued for a considerable period of time. When it is desired to stop the automatic operation quickly for a short period of time, as for example when an obstruction must be traversed, the stop lever 85 may be depressed, opening the relief valve 82. The chamber 89 is thereby exhausted completely to atmosphere, so that no pressure can be built up or maintained therein. As a result, the spring 77 immediately moves the valve member 71 to the right and holds it there, thus causing the main valve member 51 to stop in left-hand position to stop and hold the hammer assembly at the top of the latter's stroke. It will be evident that when the inlet valve 84 is closed to stop the automatic action for a longer period as previously noted, the pilot valve member 71 is also moved and held to the right in the manner described, so that the hammer similarly is stopped at the top of its stroke. Thus the combination of the spring 77 with the bleeder 83 and/or the release valve 82 provides means to assure that when automatic operation is discontinued the hammer assembly will always stop at its upper position, allowing quick moving or maneuvering of the machine without drag or interference by the tool with the underlying working surface or trench.

In order to provide for manual control of working strokes when desired, the device is equipped with a knobbed hand lever 100, Fig. 7, pivoted at 101 to a bracket 102 on the base plate 67. A pull rod 103 links the lower end of the lever 100 to a second lever 104 provided with a fork 105 adapted to engage a flange 106 on the pilot valve plunger 73. Swinging the lever 100 counter-clockwise acts through the described linkage to move the pilot valve member 71 to the left, causing the hammer to perform a single power stroke, after which retracting the lever 100 allows the pilot valve to cause return of the hammer to upper position in the manner previously described. A lower extension 107 of the lever 100 is adapted to be linked to a suitable pedal (not shown), providing for control by foot instead of by hand when desired.

The triple pneumatic combination set forth provides means for automatic hammer control with maximum flexibility, smoothness of action, and adaptability to varying operating conditions. While the over-all automatic operation of the device may be rapid, for example at a speed of about sixty working strokes per minute, the trip valve 28, due to the long taper cam surface 99, is actually opened by graduated degrees. Accordingly, adjustment of build-up of the operating overbalance pressure in the pilot valve cylinder chamber 89, and hence the proper lead timing of the pilot and main control valves with respect to the hammer strokes, may be carried out with ease and accuracy. This adjustment to achieve and maintain proper timing and pressure relation in automatic hammer control for various desired working conditions may be made while the device is in operation, as the handles 86 and 87 of the bleeder and inlet valves 83 and 84 are in easy reach of the operator. For example, in tamping fill, if it is desired to produce a slight pause or compressive dwell of the tamper 22 on the work at the end of each working stroke, the bleeder valve 83 may be set to a comparatively small opening. This causes rapid build up of pressure in the chamber 89, forcing the piston 72 and pilot valve member quickly to the left to produce the powerful down-stroke of the hammer and tamper in the manner previously described. However, as the down-stroke is completed to cut off the air supply through the trip valve 28, the constriction of the bleeder valve 88 slows the fall of pressure in the pilot chamber 89, producing a dash-pot action against return of the valve-member 71 by the spring 77, so that the hammer piston 19a and attached parts hold the tamper 22 momentarily under pressure against the working surface. The advantages of such pressure dwell in compacting certain types of fill material will be obvious to those skilled in the art.

Similarly, in case it is desired to produce a quicker fall in pressure in the chamber 89, the bleeder 83 may be given a greater opening. Such a setting may be used for example to maintain uniform automatic operation on a working surface of varying height, rendering the lengths of hammer stroke self-adjusting within practical limits. In such case, as a rise in working surface stops the hammer short of its full stroke, that is before the trip valve 28 is entirely closed, the comparatively large bleeder opening still releases air from the chamber 89 more rapidly than the reduced supply enters, allowing the spring 77 to move the valve member 71 to return-stroke position as previously described.

Between the two illustrative conditions described, a variety of intermediate adjustments of the bleeder valve 83, as well as the related inlet valve 84, may obviously be made to meet other variations in working purposes or to compensate for changes in such conditions as available air pressure, etc.

In addition to the flexibility provided by the trip valve and pilot valve combination as set forth, further refinements in control are provided by the described structure of the main control valve assembly 26. By setting the left-hand stop screw 58, the leftward travel of the valve member 51 may be limited to any desired extent. This limitation governs the extent of throttling at the port 46, thus governing the up-stroke air feed to the working cylinder and consequently controlling the overall speed of automatic operation. Similarly, by adjustment of the right-hand stop screw 60 the extent of opening of the power port 44 may be varied, thus controlling the pressure of the air delivery to the upper end of the cylinder 19 and accordingly the force of the working stroke. It will be noted that adjustment of the screw 60 is effected by the hand-wheel 62 in easy reach of the operator, so that he is enabled to vary the force of the hammer stroke from maximum to very light pressure or any intermediate condition, all while the machine is in full operation.

Since the plate 67 supporting the pilot valve and main or striking valve sub-assemblies 27 and 26 is rigidly secured to one of the upright rails 17 of the frame 16 as previously noted, the operating stations of the various manual adjustment handles are fixed with respect to the operator's station, and hence operable with maximum convenience. The provision of the flexible hoses 24 and 25 to the cylinder 19 and the flexible tubes or small hoses 35 and 88 to the trip valve 28 allow the cylinder 19 to be set at any desired vertical position in the rails 17.

Since the oil feeder 31 feeds into the common compressed air supply to the various valves as well as the cylinder 19, automatic internal lubrication is provided for all the described working parts.

While the invention has been described in preferred form it is not limited to the exact structures illustrated, as various modifications may be made without departing from the scope of the appended claims.

What is claimed is:

1. In a device of the character described, in combination, a pneumatic power cylinder having therein a double-acting reciprocable piston, a piston rod attached to said piston, a working head on said rod and adapted to hold an impact tool, said cylinder having upper and lower conduits for admitting compressed air alternately above and below said piston whereby said piston, rod, head and tool may be reciprocated, a source of compressed air, a main valve movable between two positions to open said source alternately to said upper and lower conduits of said power cylinder, a first and a second pneumatic actuator alternately operable to move said main valve to said first and second positions respectively, a pilot valve member movable in one direction to direct compressed air from said source to said first actuator and movable in the opposite direction to direct said compressed air to said second actuator, a pneumatic pilot cylinder and piston adapted to move said pilot valve member in said first direction, a trip valve mounted adjacent said power cylinder and operatively connected between said source and said pilot cylinder to direct compressed air thereto, means on said working head to operate said trip valve, and spring means to move said pilot valve member in said opposite direction.

2. The combination claimed in claim 1 including an actuating lever engaging said trip valve, a roller on said lever, and wherein said trip valve operating means includes a guide rod secured to said head and reciprocable therewith, said rod having a longitudinally tapered cam face operatively engaging said roller to move said actuating lever.

3. The combination claimed in claim 1 including a manually adjustable bleeder valve on said pilot cylinder adapted to release said compressed air gradually from said pilot cylinder while said spring means moves said pilot valve member in said opposite direction.

4. The combination claimed in claim 1 including manually operable means to move said pilot valve member in said first direction against the force of said spring means.

5. The combination claimed in claim 1 including a pair of stops respectively adjustable to determine said first and second positions of said main valve whereby the extents of opening said source to said upper and lower conduits of said power cylinder may be regulated, and exterior means to adjust at least one of said stops manually while said device is in operation.

6. A device as claimed in claim 1 including a manually adjustable bleeder on said pilot cylinder adapted to release said compressed air gradually from said pilot cylinder while said spring means moves said pilot valve member in said opposite direction, and means manually operable independently of said bleeder adjustment to exhaust said air from said pilot cylinder.

7. In a device of the character described, in combination, a pneumatic hammer, a main compressed air valve connected to said hammer and adapted to control the same to effect alternate impact and return strokes, a pilot valve connected to said main valve and operable between two alternative positions to control said main valve, permanent resilient means to urge said pilot valve into one of said positions, pneumatic means to urge said pilot valve into said other position against the urge of said resilient means, a trip valve pneumatically connected to said pneumatic means and adapted to control the same, and means on said hammer to actuate said trip valve.

8. A device as claimed in claim 7 wherein said trip valve actuating means includes a tappet adapted to engage said trip valve to operate the same, and an elongated member secured to a moving part of said pneumatic hammer, said elongated member having a longitudinally tapered cam face operatively engaging said tappet.

9. A device as claimed in claim 8 wherein said elongated member comprises a rod secured to the impact head of said hammer and slidable through a guide on a stationary part of said hammer, said tappet and said trip valve being mounted on said stationary part.

10. A device as claimed in claim 8 including means to adjust the operative engagement of said tappet with said trip valve, whereby the operative relationship between said tapered cam face and said trip valve may be varied.

11. A device as claimed in claim 9 wherein the longitudinal extent of said tapered face is substantially equal to the maximum stroke of said impact head.

12. A device as claimed in claim 7 wherein said pneumatic urging means for said pilot valve includes means forming an expansible power chamber, and including a manually adjustable inlet valve connected on one side to said chamber and on the other side via a tube to said trip valve, and a manually adjustable bleeder valve adapted to connect said chamber to the outer atmosphere.

13. A device as claimed in claim 12 including a normally closed release valve connected to said expansible chamber, and manual means to open said release valve to exhaust said chamber, whereby said pneumatic urging means may be disabled.

14. A device as claimed in claim 7 including manual means operable independently of said pneumatic urging means to move said pilot valve into said other positions against said urge of said resilient means.

15. A device as claimed in claim 7 wherein said main compressed-air valve includes a chest adapted to be connected to a source of compressed air, a wall of said chest having an exhaust port and a pair of supply ports leading to said connections to said hammer, a valve member in said chest and slidable on said wall between two positions, said member being adapted alternately in said two positions to open each one of said supply ports to said chest while connecting said other supply port to said exhaust port, a pair of opposed cylinders secured to said chest and having outer heads, pistons in said cylinders, sliding rods operatively connecting said pistons to said valve member and stop members in said heads engageable by said pistons to limit the outward travel of said pistons in said cylinders, said stop members being adjustable inwardly and outwardly whereby the extent of said openings of said supply ports to said chest may be varied.

16. A device as claimed in claim 15 including an exterior handle on one of said stops whereby the same may be manually adjusted while said device is in operation.

WALTER V. CORNETT.

References Cited in the file of this patent

UNITED STATES PATENTS

| Number | Name | Date |
|---|---|---|
| 293,371 | Stevens | Feb. 12, 1884 |
| 932,992 | Maxwell | Aug. 31, 1909 |
| 1,062,904 | Fournia | May 27, 1913 |
| 2,113,161 | Osborne | Apr. 5, 1938 |
| 2,429,780 | Terhune | Oct. 28, 1947 |
| 2,609,795 | Freedman et al. | Sept. 9, 1952 |